United States Patent
Maeda et al.

[11] Patent Number: 5,866,677
[45] Date of Patent: Feb. 2, 1999

[54] METHOD AND SYSTEM FOR PRODUCING POLY (LACTIC ACID)

[75] Inventors: Hiroshi Maeda; Kunihiko Shimizu; Yutaka Miyakawa, all of Osaka; Eiichi Kawada, Tokyo; Koji Yamamoto, Kobe; Hitomi Ohara, Kyoto-fu; Seiji Sawa, Kyoto-fu; Yasuhiro Fujii, Kyoto-fu; Masahiro Ito, Kyoto-fu, all of Japan

[73] Assignees: Kabushiki Kaisha Kobe Seiko Sho, Kobe; Shimadzu Corporation, Kyoto-fu, both of Japan

[21] Appl. No.: 886,969

[22] Filed: Jul. 2, 1997

[30] Foreign Application Priority Data

Jul. 3, 1996 [JP] Japan .................................. 8-173619

[51] Int. Cl.$^6$ .................................................. C08G 63/08
[52] U.S. Cl. ......................... 528/354; 528/328; 528/184; 528/480; 528/503
[58] Field of Search ..................................... 528/354, 503, 528/182, 916, 328, 184, 480; 425/72.1, 238

[56] References Cited

U.S. PATENT DOCUMENTS 5,444,113  8/1995  Sinclair et al. ......................... 524/306

FOREIGN PATENT DOCUMENTS 7-309863  11/1995  Japan .

*Primary Examiner*—Duc Truong
*Attorney, Agent, or Firm*—Hazel & Thomas, P.C.

[57] ABSTRACT

A method and system for producing poly(lactic acid) enable trapping and recovering of lactide vapor discharged from a reaction vessel without requiring a solvent or the like. In the method and system, lactide vapor is discharged from a polymerization reaction vessel in which poly(lactic acid) is produced by ring-opening polymerization, and trapped by solidification. The solidified lactide is liquefied by heat. Lactide can be recovered more easily and assuredly.

11 Claims, 1 Drawing Sheet

METHOD AND SYSTEM FOR PRODUCING POLY (LACTIC ACID)

BACKGROUND OF THE INVENTION

This invention relates to a method and system for producing poly(lactic acid) while recovering lactide discharged as vapor from a polymerization reaction vessel in which the lactide is subjected to ring-opening polymerization.

Poly(lactic acid) is a polymer which is able to decompose in a living body, and has been used in the medical field owing to its excellent mechanical properties. Also, poly (lactic acid) is able to decompose in a natural environment. Accordingly, it has been hoped to provide a way of using poly(lactic acid) in applications for environmental protection.

Poly(lactic acid) can be synthesized by polycondensation of lactic acid monomers, or by ring-opening polymerization of lactide dimers. Low molecular weight polymers can be easily produced by the former method. However, high molecular weight polymers is difficult to be synthesized other than the latter method.

In the case of ring-opening polymerization, there is no need to reduce the pressure inside the reaction vessel as a condition for advancing the polymerization reaction. The polymerization temperature of the polymerization reaction vessel can be regulated by vaporizing lactide and discharging it out of the reaction vessel as vapor during the course of the polymerization reaction. Furthermore, it is desirable to remove any unreacted lactide remaining around the poly(lactic acid) at the end of the polymerization reaction. A vacuum apparatus is used to reduce the pressure inside the reaction vessel and remove the lactide vapor. However, the boiling point of lactide is about 250° C. In order to remove the lactide from the reaction vessel as vapor, it is necessary to maintain the discharge line at a temperature equal to or greater than the boiling point. Moreover, the melting point of lactide is about 97° C. Any cooling of lactide to a temperature lower than the melting point results in lactide becoming solidified and causing blockages in the vacuum apparatus or other parts.

Furthermore, recovering of raw material lactide will increase the yield of poly(lactic acid). For this reason, it is desirable to positively recover lactide rather than discharging it out of the reaction vessel. However, there has been no established technique for recovering lactide vapor discharged in the process of producing poly(lactic acid).

Japanese Unexamined Patent Publication No. Hei 7-309863 discloses a method in which lactide is recovered by using a vacuum pump to suck up lactide produced by decomposition of poly(lactic acid) and introduce it into a trap for trapping lactide. Although no specific trapping method or temperature conditions are disclosed, the publication suggests that lactide could be trapped by filling the trap with an alcohol. However, when lactide is recovered using an alcohol, it becomes necessary to include a refining process for separating the lactide from the alcohol before reuse of the recovered lactide. This requires complicated equipment.

There has therefore been a demand for novel poly(lactic acid) production method and system which make it possible to trap and recover lactide vapor and reuse recovered lactide vapor as raw material without using a solvent such as alcohol.

SUMMARY OF THE INVENTION

It is an object of the present invention to provide a method and system for producing poly(lactic acid) which has overcome the problems residing in the prior art.

It is another object of the present invention to provide a method and system for producing poly(lactic acid) which can assuredly trap and recover lactide vapor discharged from a reaction vessel without any need for a solvent and the like.

According to an aspect of the present invention, a method for producing poly(lactic acid) comprises the steps of: discharging lactide vapor from a polymerization reaction vessel in which poly(lactic acid) is produced by ring-opening polymerization; trapping the discharged lactide vapor by solidifying it; and liquefying the solidified lactide by heating it.

According to another aspect of the present invention, a system for producing poly(lactic acid) comprises a polymerization reaction vessel which is operable to produce poly (lactic acid) in ring-opening polymerization of lactide; and a heat exchanger which is connected with the polymerization reaction vessel and is operable to solidify lactide vapor discharged from the polymerization reaction vessel and liquefy the solidified lactide.

In the poly(lactic acid) production method and system, lactide vapor is drawn up from the polymerization reaction vessel, and trapped in a predetermined chamber by solidification. The solidified lactide is liquefied by heat for reuse in the polymerization reaction vessel. Accordingly, lactide vapor discharged from a reaction vessel can be efficiently trapped and recovered without any need for a solvent and the like.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1:
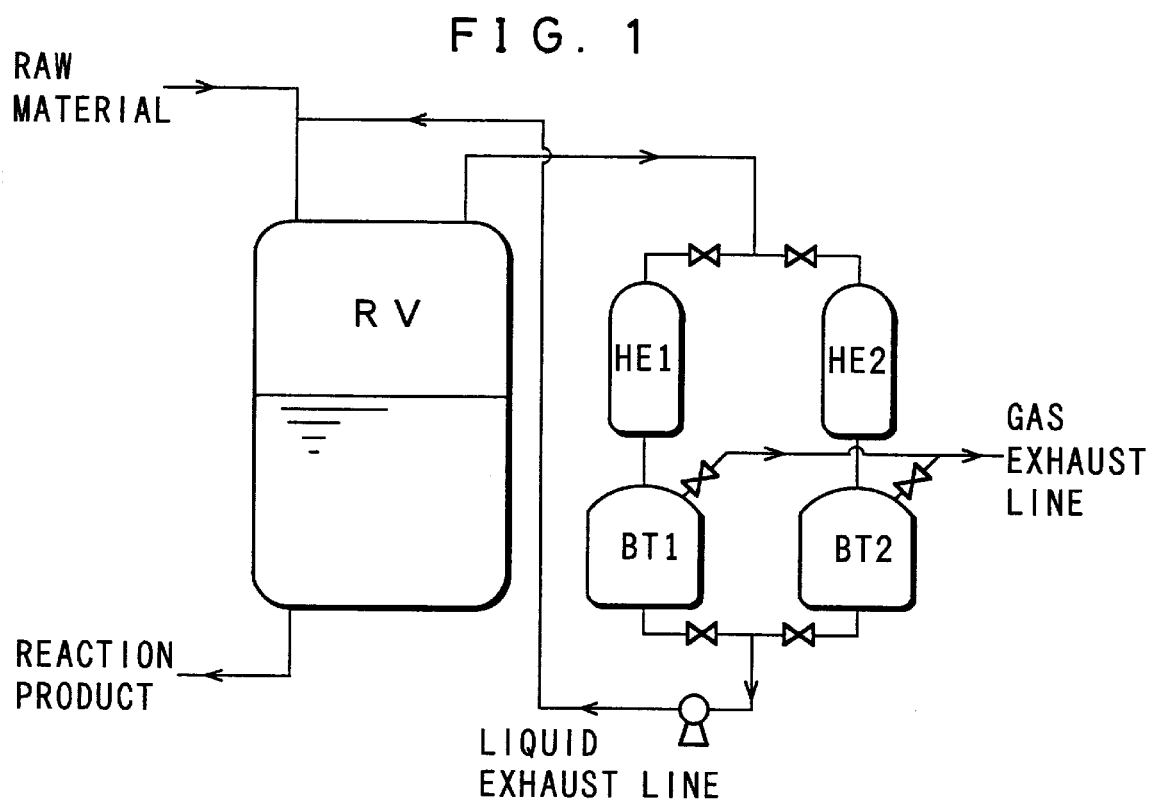
FIG. 1 is a generalized diagram showing a construction of a system for producing poly(lactic acid) embodying the present invention.

There could be considered a method in which lactide discharged as vapor from a polymerization reaction vessel is cooled to a temperature between its boiling point and melting point to liquefy it, and then recovered in the liquid phase. However, when one tries to collect lactide by introducing lactide vapor into a heat exchanger maintained at a temperature below the boiling point but above the melting point to liquefy it, it would be found that not all of lactide is converted into liquid due to the high vapor pressure of lactide, and that a lot of lactide vapor passes right through the heat exchanger in the vapor phase without becoming liquid. In other words, all of lactide vapor is not trapped, consequently resulting in a reduction in the collection amount.

In a method and system according to the present invention, lactide vapor is introduced into a heat exchanger and first cooled to a temperature below its melting point to solidify it. Accordingly, the lactide vapor can be assuredly trapped. It is therefore possible to prevent lactide vapor passing through heat exchangers and causing blockages in vacuum apparatus, and to prevent lactide vapor from being discharged out of the system, making it possible to increase the amount of unreacted lactide monomer, which can be recovered.

When introducing the lactide vapor into the heat exchanger to solidify it, the temperature inside the heat exchanger should be set to below the melting point of lactide, specifically, any temperature below about 97° C., and preferably to 70° C. or lower. Furthermore, when melting the trapped solidified lactide inside the heat exchanger, the temperature inside the heat exchanger should be set to a temperature below the boiling point but no less than the melting point. A temperature between 100° C. and 160° C. is preferable, and a temperature between 100° C. and 120° C. is further preferable.

When discharging the lactide from the reaction vessel as vapor, the lactide can be vaporized by reducing the pressure inside the reaction vessel using a vacuum apparatus, or by supplying a carrier gas such as nitrogen gas into the reaction vessel to lower the lactide vapor concentration relative to the carrier gas, and thereby lower the partial pressure of the lactide below the vapor pressure thereof.

After the lactide vapor has been trapped in the heat exchanger by cooling the lactide vapor to a temperature below the melting point to solidify it, the lactide can be recovered by closing the flow line between the polymerization reaction vessel and the heat exchanger and the flow line downstream of the heat exchanger, and heating the lactide solidified inside the heat exchanger to liquefy it.

Furthermore, in a case where a plurality of flow lines are provided downstream of the polymerization reaction vessel in parallel, and a heat exchanger is provided in each flow line, the lactide vapor discharged from the polymerization reaction vessel can be continuously recovered by switching between the plurality of flow lines to use the plurality of heat exchangers alternately.

FIG. 1 is a diagram showing a general construction of a system for producing poly(lactic acid) of the present invention. The system is provided with two heat exchangers HE1, HE2. Downstream of the reaction vessel RV, such as polymerization tank or extruder, a first flow line and second flow line are provided in parallel, and flow changer valves are provided at the inlet and outlet of each flow line. In each flow line, there is provided a heat exchanger HE1 (HE2) together with a buffer tank BT1 (BT2) having a heat insulation device. The heat exchangers HE1, HE2 are constructed such that the temperature inside thereof can be arbitrarily controlled by, for example, introducing heat transfer mediums at different temperatures. The downstream side of the buffer tank BT1 (BT2) is connected to a gas exhaust line and a liquid exhaust line. The gas exhaust line can be used to discharge carrier gas such as nitrogen gas into the atmosphere or a vacuum apparatus can be fitted thereto to draw gas. The liquid exhaust line is maintained at a temperature higher than the melting point of the lactide, and lactide stored in the buffer tank BT1 (BT2) is discharged therethrough.

When recovering the lactide from the reaction vessel RV, the inside of the heat exchanger HE1 in the first flow line is cooled in advance to a temperature below the melting point, and the lactide vapor is introduced from the reaction vessel RV into this heat exchanger HE1 and solidified. When the amount of solid lactide reaches a specific level, the valves are switched and the lactide vapor is introduced into the heat exchanger HE2 in the second flow line. Next, the temperature inside heat exchanger HE1 is heated to a temperature below the boiling point but no less than the melting point to liquefy the solid lactide. Thereafter, the liquid lactide is transported from the heat exchanger to the next stage. By providing a plurality of heat exchangers in this way, the lactide vapor can be removed from the reaction vessel RV continuously.

According to the present invention, in FIG. 1, it may be possible to eliminate the buffer tanks BT1 and BT2 provided downstream of the heat exchangers HE1 and HE2. However, it is recommendable to provide them because of the fact that the liquid lactide, which has been liquefied in the heat exchanger HE1 (HE2), is stored in the buffer tank BT1 (BT2), which makes it possible to circulate the liquefied lactide back to the polymerization reaction vessel RV in accordance with the amount required for the polymerization reaction in the case of continuous operation.

The present invention will be described in further detail by means of several examples. However, these examples are not intended to limit the scope of the present invention, and any variation in design made in light of the disclosure and hereunder shall be deemed to be within the technical scope of the present invention.

EXAMPLES

An agitated layer type reaction vessel equipped with a large high viscosity stirring blade (full zone blade made by Shinko Pantec) was used as the reaction vessel RV. Lactide and tin-iso-octoate catalyst were supplied to the reaction vessel RV at rates of 10 kg/h and 0.5 g/h respectively. The target temperature for the polymerization reaction was 160° C., the pressure inside the reaction vessel RV was set to 100 mmHg, and the polymerization reaction was carried out under a flow of nitrogen gas.

The poly(lactic acid) produced from this polymerization reaction was removed from the polymerization reaction vessel RV at a flow rate of slightly less than 10 kg/h using a gear pump, the liquid level inside the polymerization reaction vessel RV was thereby kept constant.

At the same time, the lactide discharged from the reaction vessel RV as vapor was introduced into the heat exchanger HE1, which is one of the two heat exchangers HE1, HE2 whose inside had been cooled to 50° C., to solidify it. When the amount of lactide collected as a solid reached a specific level (after about 2 hours), the valves were switched and the lactide vapor was introduced into the other heat exchanger HE2. The heat exchanger HE1 was then heated to 140° C. to liquefy the lactide collected as a solid, and the lactide liquid was removed from the heat exchanger HE1. Thereafter, the temperature inside the heat exchanger HE1 was again cooled to 50° C.

By repeatedly switching between the heat exchangers HE1 and HE2 and carrying out this temperature control, it was possible to collect about 40 kg of lactide after continuing the polymerization reaction for about 200 h, and there was no occurrence of lactide blockages inside the vacuum pump.

As mentioned above, poly(lactic acid) is produced by ring-opening polymerization of lactide inside a polymerization reaction vessel. Lactide discharged as vapor from the polymerization reaction vessel is trapped by cooling it to below the melting point of lactide to solidify it. Thereafter, the lactide is recovered by heating the solidified lactide to liquefy it. Accordingly, lactide vapor can be reliably trapped. Also, liquid lactide can be recovered more easily without any solvent.

Further, the solidification and liquefaction of lactide are carried out in heat exchangers. This will assure high efficiency of recovery of liquid lactide.

According to the present invention, moreover, it should be noted that raw materials for production of poly(lactic acid) is not limited to pure lactide. Any material can be used provided it mainly include lactide, and it may include some amount of lactic acid and/or oligomers. Also, it may be possible to use not only lactide vapor which is discharged during the course of the polymerization reaction but also unreacted lactide which remains around poly(lactic acid) at the end of the polymerization reaction.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A method for producing poly(lactic acid) comprising the steps of:

discharging lactide vapor from a polymerization reaction vessel in which poly(lactic acid) is produced by ring-opening polymerization;

trapping the discharged lactide vapor by solidifying it; and liquefying the solidified lactide by heating it.

2. A method according to claim 1, wherein the discharged lactide vapor is solidified by cooling it to below its melting point.

3. A method according to claim 2, wherein the discharged lactide vapor is introduced into a heat exchanger to perform the solidifying and the liquefying.

4. A method according to claim 3, wherein the discharged lactide vapor is introduced into a plurality of heat exchanger in a predetermined order to recover the discharged lactide continuously.

5. A system for producing poly(lactic acid) comprising:

a polymerization reaction vessel which is operable to produce poly(lactic acid) in ring-opening polymerization of lactide;

a heat exchanger which is connected with the polymerization reaction vessel and is operable to solidify lactide vapor discharged from the polymerization reaction vessel and liquefy the solidified lactide.

6. A system according to claim 5, wherein a plurality of heat exchangers are connected with the polymerization reaction vessel.

7. A system according to claim 6, further comprising a flow changer provided between the polymerization reaction vessel and the plurality of heat exchangers for changing flow of discharged lactide vapor from the polymerization reaction vessel to the plurality of heat exchangers.

8. A system according to claim 7, wherein the flow changer includes a valve.

9. A system according to claim 5, further comprising a buffer tank provided between the heat exchanger and the polymerization reaction vessel for storing liquefied lactide.

10. In an improved method for the production of poly(lactic acid) by ring-opening polymerization in a polymerization reaction vessel, wherein the improvement comprises discharging lactide vapor from the reaction vessel to a heat exchanger in which the lactide is solidified by cooling the lactide vapor to below its melting point, after which the solidified lactide is heated to liquefy and recover the raw lactide, and the recovered raw lactide is reused in the production of the poly(lactic acid).

11. A method as claimed in claim 10 wherein the raw lactide is recovered without the use of a solvent.

* * * * *